(12) United States Patent
Stanley

(10) Patent No.: US 9,201,453 B2
(45) Date of Patent: Dec. 1, 2015

(54) SELF-RETRACTING CONNECTOR FOR DOCKING DEVICE

(71) Applicant: Apple Inc., Cupertino, CA (US)

(72) Inventor: Craig Stanley, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 13/662,375

(22) Filed: Oct. 26, 2012

(65) Prior Publication Data

US 2014/0118923 A1     May 1, 2014

(51) Int. Cl.
     *G05F 1/16*        (2006.01)
     *G06F 1/16*        (2006.01)
     *H04M 1/04*       (2006.01)

(52) U.S. Cl.
     CPC ............ *G06F 1/1626* (2013.01); *G06F 1/1632* (2013.01); *H04M 1/04* (2013.01)

(58) Field of Classification Search
     CPC ....... G06F 1/1626; G06F 1/1632; H04M 1/04
     USPC ................ 361/679.01, 679.02, 679.4–679.44
     See application file for complete search history.

(56) References Cited

U.S. PATENT DOCUMENTS

| | | |
|---|---|---|
| 5,144,290 A | 9/1992 | Honda et al. |
| 5,290,178 A | 3/1994 | Ma |
| 5,535,093 A | 7/1996 | Noguchi et al. |
| 5,751,546 A | 5/1998 | Clark et al. |
| 6,108,200 A | 8/2000 | Fullerton |
| 6,193,546 B1 | 2/2001 | Sadler |
| 6,203,363 B1 | 3/2001 | Yanaura |
| 6,290,534 B1 | 9/2001 | Sadler |
| 6,339,699 B1 | 1/2002 | Hirai et al. |
| 6,366,450 B1 | 4/2002 | Janicek |
| 6,672,558 B2 * | 1/2004 | Li ................................. 248/463 |
| 6,683,786 B2 | 1/2004 | Yin et al. |
| 6,716,058 B2 | 4/2004 | Youn |

(Continued)

FOREIGN PATENT DOCUMENTS

| | | |
|---|---|---|
| CN | 2591619 Y | 12/2003 |
| GB | 2 127 235 A | 4/1984 |

(Continued)

OTHER PUBLICATIONS

Office Action for Australian Patent Application No. 2010337033, mailed Jun. 11, 2013, 3 pages.

(Continued)

*Primary Examiner* — Bernard Rojas
(74) *Attorney, Agent, or Firm* — Kilpatrick Townsend & Stockton LLP

(57) ABSTRACT

Docking stations that can include a durable, movable plug connector are provided. For example, the plug connector can rotate and retract into or extend out of an opening of the docking station housing, thereby reducing the likelihood of breakage caused by misuse. A pivoting retraction mechanism can be rotatably coupled to the plug connector to allow the plug connector to be movable. The retraction mechanism can be a compliant mechanism that is formed from a single piece of material. The plug connector can be biased in a first position by a biasing element that also returns the plug connector to the first position after moving. The opening in the docking station that accommodates the plug connector's full range of motion may only be slightly larger than the plug connector.

30 Claims, 6 Drawing Sheets

(56) References Cited

U.S. PATENT DOCUMENTS

| | | |
|---|---|---|
| 6,898,080 B2 | 5/2005 | Yin et al. |
| 6,926,130 B2 | 8/2005 | Skowronski |
| 7,014,486 B1 | 3/2006 | Wu |
| 7,066,752 B2 | 6/2006 | Hsu et al. |
| 7,352,567 B2 | 4/2008 | Hotelling et al. |
| 7,538,792 B2 | 5/2009 | Takahashi |
| 7,544,066 B1 | 6/2009 | Lynch et al. |
| 7,580,255 B2 | 8/2009 | Crooijmans et al. |
| 8,113,873 B1 * | 2/2012 | Sarraf ............................ 439/533 |
| 8,223,483 B2 | 7/2012 | Hayashida et al. |
| 8,323,040 B2 | 12/2012 | Prest |
| 8,721,356 B2 | 5/2014 | Webb et al. |
| 2004/0109722 A1 | 6/2004 | Huang |
| 2004/0224638 A1 | 11/2004 | Fadell et al. |
| 2005/0265569 A1 | 12/2005 | Langberg et al. |
| 2006/0061958 A1 | 3/2006 | Solomon et al. |
| 2006/0187629 A1 | 8/2006 | Emery et al. |
| 2006/0250764 A1 | 11/2006 | Howarth et al. |
| 2006/0274910 A1 | 12/2006 | Schul et al. |
| 2006/0285710 A1 | 12/2006 | DeVesto |
| 2007/0035917 A1 | 2/2007 | Hotelling et al. |
| 2007/0073952 A1 | 3/2007 | Tsai et al. |
| 2007/0230723 A1 | 10/2007 | Hobson et al. |
| 2007/0273327 A1 | 11/2007 | Daniel et al. |
| 2008/0259550 A1 * | 10/2008 | Lien .............................. 361/683 |
| 2009/0009957 A1 | 1/2009 | Crooijmans et al. |
| 2010/0062615 A1 | 3/2010 | Prest |
| 2010/0158297 A1 | 6/2010 | Stuezynski |
| 2011/0164375 A1 * | 7/2011 | Hayashida et al. ...... 361/679.41 |
| 2012/0264329 A1 | 10/2012 | Hayashida et al. |
| 2013/0163186 A1 * | 6/2013 | Mizusawa ................ 361/679.41 |

FOREIGN PATENT DOCUMENTS

| | | | |
|---|---|---|---|
| GB | 2 351 187 A | | 12/2000 |
| GB | 2 433 845 A | | 7/2007 |
| JP | H05-289776 A | | 11/1993 |
| JP | H10-133780 A | | 5/1998 |
| WO | 2005/047052 A | | 5/2005 |
| WO | 2008/061040 A2 | | 5/2008 |
| WO | 2009/024749 A1 | | 2/2009 |
| WO | 2011/080653 A2 | | 7/2011 |

OTHER PUBLICATIONS

Office Action dated Sep. 11, 2013 in Japanese Patent Application No. 2012-547146, 2 pages (English Translation).

Office Action dated Sep. 30, 2013 in Korean Patent Application No. 10-2012-7020562, 2 pages (English Translation).

Office Action for Chinese Patent Application No. 201080003711.4, mailed Dec. 26, 2013, 17 pages.

International Search Report for PCT/US2010/061577, dated Apr. 28, 2011, 10 pages.

International Search Report for PCT/US2009/052664, dated Nov. 4, 2009, 7 pages.

International Preliminary Report on Patentability for PCT/US2010/061577, mailed Jul. 12, 2012, 7 pages.

SDI Technologies, Inc. "iHome Model iA100 Bluetooth Audio System for iPad/iPhone/iPod" user manual, 2010, 17 pages.

Koninklijke Philips Electronics N.V., "DC290" user manual, 2012, 17 pages.

Koninklijke Philips Electronics N.V., "DS7650" user manual, 2011, 4 pages.

Stem Innovation, LLC, "TimeCommand App-Enhanced Audio Alarm Dock for iPod, iPhone and iPad" user guide, 2011, 11 pages.

Office Action for Chinese Patent Application No. 201080003711.4, mailed Apr. 28, 2013, 19 pages.

Final Office Action for U.S. Appl. No. 13/533,132, mailed Nov. 14, 2014, 7 pages.

Non-Final Office Action for U.S. Appl. No. 13/533,132, mailed Aug. 8, 2014, 11 pages.

* cited by examiner

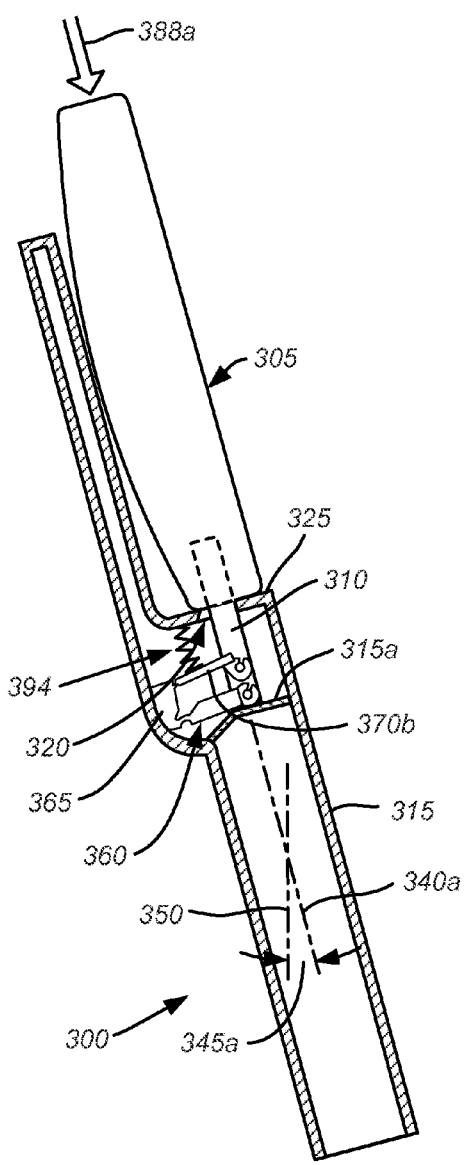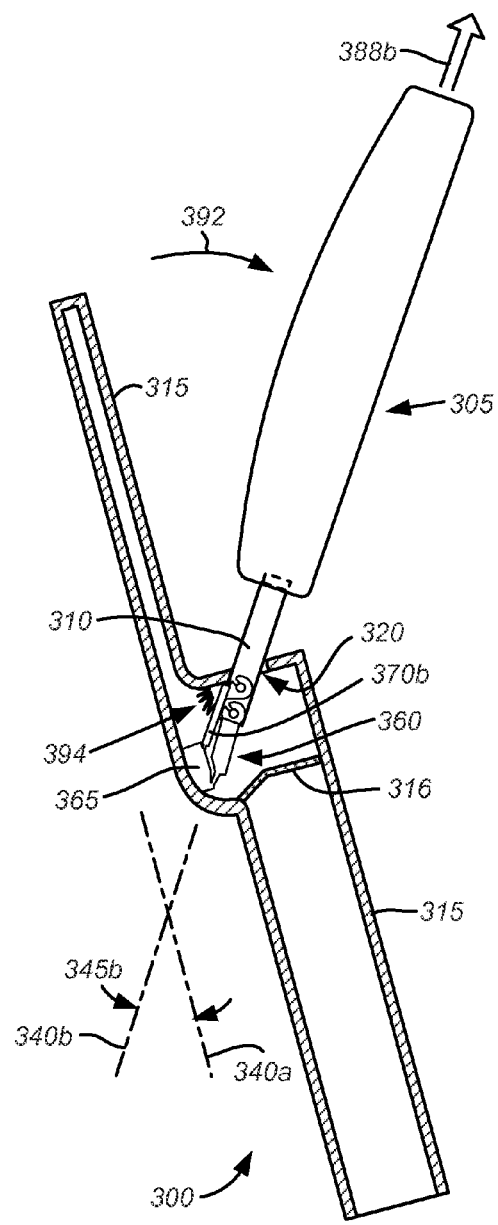
*Figure 3A*  *Figure 3B*

SELF-RETRACTING CONNECTOR FOR DOCKING DEVICE

BACKGROUND OF THE INVENTION

The present invention relates to a docking station for an electronic device. More particularly, the present invention relates to a docking station having a self-retracting connector.

Portable electronic devices (such as phones, media players, notebook/netbook computers, tablet computers) are becoming ubiquitous. Portable electronic devices commonly have display screens (e.g. a touch screen) on which users view and/or select data and functionality. For example, a user may select a video or other presentation to watch. In such circumstances, it is more convenient for the user to have the device in an upright (viewable) position by placing the device in some sort of holder so the user is not forced to hold the device during viewing.

Additionally, users would like to interface the display devices with other electronics. For example, a user may want to play music through speakers, or simply charge the device. However, during such interfacing or charging, the user would still like to be able to view the display and/or controls of the device.

To provide such features, manufacturers provide docking stations (docks) in which a user can dock a device. Often the docks will have a connector rising out from an opening, with the connector being in a position such that the device can be viewed and/or used when connected therewith. However, connectors can be weak points, especially when devices become large and additional stresses are placed on the connector. The connector may also provide most of the support for the device. Accordingly, the connectors of such docking stations can be damaged by misuse, e.g. being pulled in an improper direction.

Some currently available docks include a rotating connector that rotates instead of breaking when stresses are applied to the connector. However, in order to accommodate rotating connectors, such docks often include a large, unsightly opening through which the connector or other unsightly features for accommodating the rotating connector may extend. The unsightliness of these openings may result from large gap(s) between the bounds or sidewalls of the opening station and the connector rising out of the opening. Furthermore, many docking stations with rotating connectors still have room for improvement in terms of manufacturability and convenience in disconnecting from corresponding portable electronic devices.

BRIEF SUMMARY OF THE INVENTION

Embodiments of the present invention provide docking stations with a connector, e.g., a plug connector, that is durable. Some embodiments allow a plug connector to move while connected to a portable electronic device. This movement of the connector can absorb undesirable forces, thereby reducing the likelihood of the connector breaking from misuse. In one example, if the connected portable electronic device is pushed forward and applies a torque to the plug connector of the docking station, the plug connector can rotate and retract into an opening of the docking station housing, thereby reducing the likelihood of breakage from such a push. The retracting motion can also aid in disconnecting the plug connector from the device, and thus can help prevent the torque from further acting on the plug connector.

Additionally, the movable plug connector may be biased with a biasing element to return the plug connector to its original position after rotating and retracting or extending in response to an applied torque. When a device is connected with the plug connector in the original position, the portable electronic device may be positioned in an upright position such that the electronic device is supported by a resting surface of the docking station, thereby preventing undue strain on the plug connector in the upright position. The biasing mechanism can act by opposing forward movement of the plug connector to keep the electronic device in a position to be supported by the rear reference surface. The plug connector may be partly below and partly above an exterior surface of the docking station through part of or all of the plug connector's full range of motion.

The opening in the docking station that accommodates the plug connector's full range of motion may only be slightly larger than the plug connector. This may be possible because a retraction mechanism of the docking station may produce a range of motion for the plug connector that does not require as large of an opening as required by typical docking stations. Hence, unsightly gaps between the docking station opening and the plug connector may be reduced in order to maintain the cosmetic appearance of the docking station.

According to one embodiment, a docking station is provided. The docking station can include a housing that defines a cavity. The housing can include an opening in an exterior surface that communicates with the cavity. The docking station can also include a plug connector movable between a first position where the plug connector extends a first distance out of the opening in a first orientation and a second position where the plug connector extends out of the opening at a second distance that is shorter than the first distance in a second orientation that is different than the first orientation. An anchor element can be positioned within the cavity. The docking station can further include one or more actuation members, each actuation member being pivotably coupled to the anchor element and rotatably coupled to the plug connector, that, when a torque is applied to a distal end of the plug connector in the first position, move the plug connector to the second position. A biasing element can be coupled to one or more of the actuation members to bias the actuation members to position the plug connector in the first position.

According to another embodiment, a docking station is provided. The docking station can include a housing that defines a cavity. The housing can include an opening in an exterior surface that communicates with the cavity. The docking station can also include a plug connector movable between a first position where the plug connector extends a first distance out of the opening in a first orientation and a second position where the plug connector extends out of the opening at a second distance that is longer than the first distance in a second orientation that is different than the first orientation, the plug connector configured to receive and electrically couple to a receptacle connector of the portable electronic device. The docking station can further include a retraction mechanism that causes the plug connector to move between the first and second positions. The retraction mechanism can include: an anchor element positioned within the cavity; one or more actuation members, each actuation member being pivotably coupled to the anchor element and rotatably coupled to the plug connector; and a biasing element coupled to one or more of the actuation members to bias the actuation members to position the plug connector in the first position; and electronic circuitry electrically coupled with contacts of the plug connector.

According to yet another embodiment, a docking station is provided. The docking station can include a housing that defines a cavity. The housing can include an opening in an exterior surface that communicates with the cavity, and a first end and a second end opposite the first end. The docking station can also include a plug connector that rotates between a first position where the plug connector extends a first distance out of the opening in a first orientation and a second position where the plug connector extends out of the opening at a second distance that is shorter than the first distance in a second orientation where a distal end of the plug connector is rotated from the first orientation toward the first end of the housing and a proximal end of the plug connector is rotated from the first orientation toward the second end of the housing. An anchor element can be positioned within the cavity. The docking station can further include one or more actuation members, each actuation member being pivotably coupled to the anchor element and rotatably coupled to the plug connector, that, when a torque is applied to the distal end of the plug connector in the first position, move the plug connector to the second position. A biasing element can be coupled to one or more of the actuation members to bias the actuation members to position the plug connector in the first position.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 2A shows a plug connector of docking station 200 in an extended position and connected with the device. FIG. 2B shows the plug connector in a refracted position and nearly disconnected from the device.

FIGS. 3A and 3B show cross-sectional views of a docking station 300 according to an embodiment of the present invention with a portable electronic device docked therein. FIG. 3A shows a plug connector of docking station 300 in a retracted position and connected with the device. FIG. 3B shows the plug connector in an extended position and nearly disconnected from the device FIG. 4A shows a plug connector of docking station 400 in an extended position and connected with the device. FIG. 4B shows the plug connector in a refracted position and nearly disconnected from the device.

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Embodiments of the present invention provide docking stations with a connector, e.g., a plug connector, that is durable. The plug connector may rotate and retract into an opening of the docking station housing when torque is applied to the plug connector, thereby reducing the likelihood of plug connector breakage due to applied torques. Toque may be applied to the connector in a number of situations, including when a connected portable electronic device is improperly disconnected from the plug connector of the docking station.

Unlike typical rotatable connectors, in embodiments of the present invention, the range of motion that the docking station's plug connector goes through as it retracts into the housing and then returns to the original, extended position does not require the opening of the plug connector to be large and unsightly. Instead, the plug connector may rotate and move up or down simultaneously such that the opening of the docking station need only be slightly larger than the plug connector to accommodate the plug connector's range of motion. The combined rotational and up/down movement of the plug connector may be accomplished with a compliant retraction mechanism or other four-bar retraction mechanism positioned within the cavity of the housing, which retraction mechanisms may be coupled to the plug connector.

Embodiments of the compliant retraction mechanisms may be formed from a single piece of material. Alternatively, the compliant retraction mechanism may be integrally formed with the housing. As used herein, compliant mechanism refers to mechanisms that include one or more flexures or flexible joints that may elastically deform in order to accommodate motion for the linkages or members connected thereto.

As discussed earlier, portable electronic devices may be connected with or docked in docking stations according to the present invention. Examples of electronic devices that may be used with the present invention are shown in the following figure.

Figure 1A:
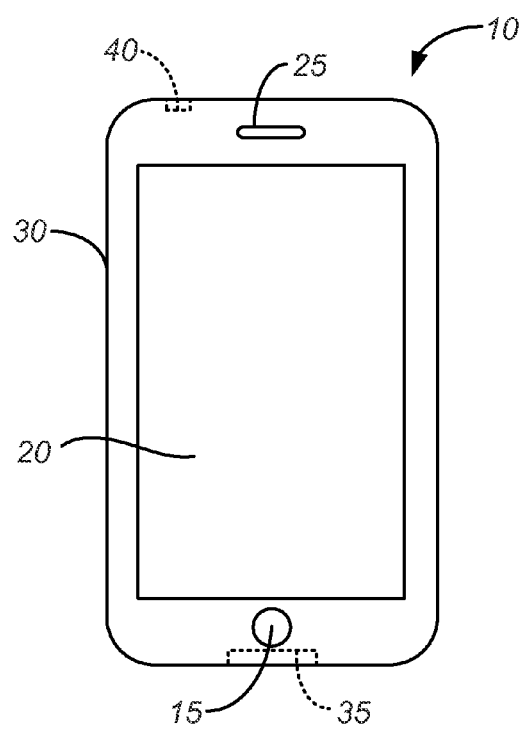
FIG. 1A depicts an illustrative rendering of one particular portable electronic device.

FIG. 1A depicts an illustrative rendering of one particular portable electronic device 10. Device 10 includes a multipurpose button 15 as an input component, a touch screen display 20 as both an input and output component, and a speaker 25 as an output component, all of which are housed within a device housing 30. Device 10 also includes a primary receptacle connector 35 and an audio plug receptacle 40 within device housing 30. Each of the receptacle connectors 35 and 40 can be positioned within housing 30 such that the cavity of the receptacle connectors into which a corresponding plug connector is inserted is located at an exterior surface of the device housing. In some embodiments, the cavity opens to an exterior side surface of device 10. For simplicity, various internal components, such as the control circuitry, graphics circuitry, bus, memory, storage device and other components are not shown in FIG. 1A. Embodiments of the invention disclosed herein may include plug connectors that are particularly suitable for connecting with primary receptacle connector 35.

Although device 10 is described above as one particular portable electronic device, embodiments of the invention are suitable for use with a multiplicity of portable electronic devices. As used herein, a portable electronic device is of such size and proportion that it may be carried in the hand(s) of a person. Examples of portable electronic devices include, but are not limited to, media players that play or otherwise transmit audio and/or visual (video or picture) signals (e.g., iPod) and phones that allow users to communicate remotely through wireless connections. Portable electronic devices may also correspond to mini-computers, tablet computers, PDAs, internet or email based devices. In fact, portable electronic devices may be a combination of specific or dedicated devices mentioned above (e.g., a smart phone such as the iPhone™), manufactured and sold by Apple Inc. of Cupertino, Calif., the assignee of the present application.

As discussed in the background section, in some circumstances, it is more convenient for the user to position device 10 in an upright (viewable) position by placing the device in some sort of holder so the user is not forced to hold the device during viewing. This may be useful for viewing a video or other presentation on display 20. Alternatively, a user may want to play music stored on device 10 through external speakers, or simply charge the device. All these things may be accomplish using a docking station, e.g., a docking station according to the present invention as shown in the following figure.

Figure 1B:
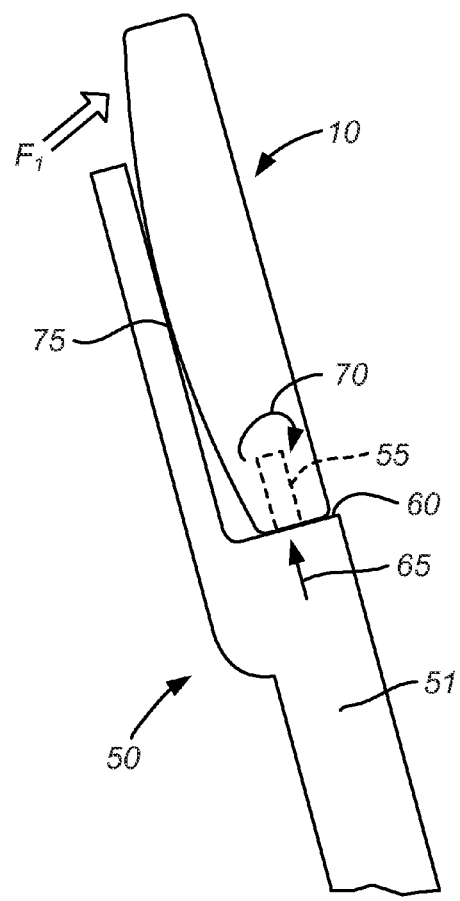
FIG. 1B is a side view of a docking station according to the present invention mated with the device of FIG. 1A.

FIG. 1B is a side view of a docking station 50 according to the present invention mated with device 10. Docking station 50 includes a plug connector 55 that extends through an opening (not shown in FIG. 1B) in an exterior surface 60. Plug connector 55 generally defines a mating axis 65 along which a corresponding receptacle connector (e.g., connector receptacle 35 shown in FIG. 1A) of a device 10 can connect with or disconnect from plug connector 55. As shown in FIG. 1B, device 10 is docked in docking station 50 and plug connector 55 is mated or connected with a receptacle connector (not shown in FIG. 1B) of device 10. Device 10 is docked in and removed from docking station 50 in order to couple with and decouple from the electrical contacts associated with the plug connector 55 and a corresponding receptacle connector.

When device 10 is docked in or removed from docking station 50, off-axis forces—forces that are not along mating axis 65—may be exerted on plug connector 55. For example, during a removal event, device 10 may be rotated in any direction or pushed or pulled away from mating axis 65, thereby exerting the aforementioned off-axis forces on plug connector 55. More specifically, an exemplary force F1 may be applied to device 10 during a removal event such that a torque 70 is applied to plug connector 55. As will be discussed in further detail below, plug connectors according to the present invention, e.g., plug connector 55, are movable in order to absorb these off-axis forces and reduce the likelihood of breakage.

As further shown in FIG. 1B, the portion of plug connector 55 extending out of housing 51 is free of external supports. Accordingly, in some embodiments, housing 51 may include a protrusion that includes a resting surface 75 for supporting device 10 when docked in docking station 50. Device 10 may be positioned when docked such that device 10 is supported by rest surface 75, thereby preventing undue strain on plug connector 55 caused by the weight of the device torquing the plug connector as the device leans along an off-axis direction—a direction that is not along mating axis 65.

In various embodiments, plug connector 55 can correspond to USB, FireWire, or other standardized connector formats having contacts for transmitting data and/or power For example, plug connector 55 may be a 30-pin or Lightning connector compatible with the Apple iPod® and iPhone™ devices. In one embodiment, device 10 can have a female receptacle connector that connects with plug connector 55, which may be a male connector plug. In alternative embodiments, device 10 can have a male connector that connects with a female connector of a dock. In this embodiment, the female connector may be situated within dock housing 51.

As mentioned above, plug connector 55 of dock 50 may be movable by means of a retraction mechanism. Specific examples of docking stations including retraction mechanisms according to the present invention are shown in the following figures.

Figure 2A:
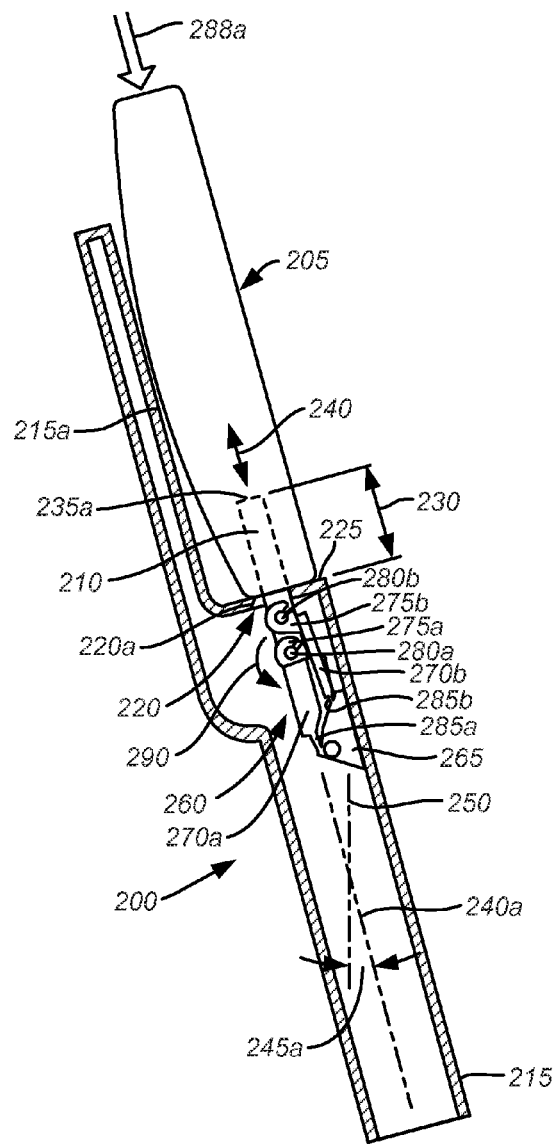
FIGS. 2A and 2B show cross-sectional views of a docking station 200 according to an embodiment of the present invention with a portable electronic device docked therein.
Figure 2B:
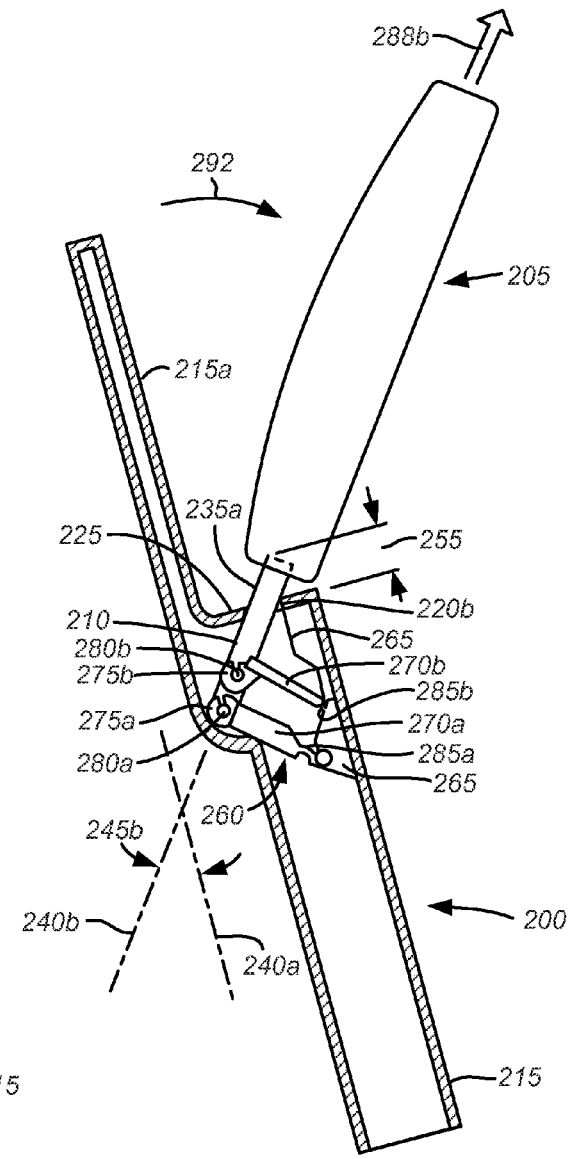

FIGS. 2A and 2B show cross-sectional views of a docking station 200 according to an embodiment of the present invention with a portable electronic device 205 docked therein. FIG. 2A shows a plug connector 210 of docking station 200 in an extended position and connected with device 205. FIG. 2B shows plug connector 210 in a retracted position and nearly disconnected from device 205. As mentioned above, docking stations such as docking station 200 can provide a platform for quickly and easily coupling device 205 to another system or device, e.g., a computer, a power source, or peripheral devices such as a monitor, a keyboard, speakers, etc. Docking station 200 can also hold device 205 in a position suitable for viewing a display (e.g., display 20 shown in FIG. 1A) of device 205.

Plug connector 210 may be movable between a retracted position and an extended position for engaging a corresponding connector (e.g., connector 35 as shown in FIG. 1A) of device 205. More specifically, FIG. 2A shows plug connector 210 in the extended position with plug connector 210 protruding through an opening 220 in exterior surface 225 of housing 215 at an extension distance 230. Distance 230 is measured from exterior surface 225 to a distal end 235$a$ of plug connector 210 along an axis 240$a$ and may be equal to the full length of the mating portion of plug connector 210. Axis 240$a$ may define the orientation of plug connector 210 in the extended position, which axis 240$a$ may be perpendicular with respect to the plane in which exterior surface 225 is oriented such that axis 240$a$ is at an angle 245$a$ with respect to vertical 250. As shown in FIG. 2A, angle 245$a$ may be about 15 degrees. In some embodiments, angle 245$a$ may be between about 10 and 35 degrees. In other embodiments, angle 245$a$ may be such that plug connector 210 is orientated in a substantially vertical orientation (e.g., within about 5 degrees of vertical 250). FIG. 2A also shows plug connector 210 can be partly within an interior of housing 215 and extend through opening 220 when in the extended position.

FIG. 2B shows plug connector 210 in the retracted position with plug connector 210 rotated forward (clockwise as shown) and partially retracted into housing 215 with device 205 nearly disconnected from plug connector 210. In this retracted position, plug connector 210 still protrudes through opening 220, but only at a distance 255. Distance 255 is measured from exterior surface 225 to distal end 235$a$ and may be a distance such that the receptacle connector of device 205 can no longer mate with plug connector 210 because access is blocked by housing 215. Axis 240$b$ may define the orientation of plug connector 210 in the retracted position, which axis 240$b$ may be at an angle 245$b$ with respect to axis 240$a$. As shown in FIG. 2B, angle 245$b$ may be about 30 degrees. In other embodiments, angle 245$b$ may be between about 5 and 40 degrees.

As discussed above, the movement of plug connector 210 may be a combination of different movements, e.g., rotating and retracting into or extending out of opening 220. A retraction mechanism 260 may guide plug connector 210 between the extended and retracted positions. As shown in FIGS. 2A and 2B, retraction mechanism 260 may be rotatably coupled with plug connector 210. For example, retraction mechanism 260 may include linkages or actuation members 270a, 270b having hooks 275a, 275b positioned thereon that couple with complementary protrusions 280a, 280b positioned on plug connector 210. In other embodiments, hooks 275a, 275b and protrusions 280a, 280b may be replaced with other types of pin or revolute joints.

As shown in FIGS. 2A and 2B, actuation members 270a, 270b and anchor element 265 may be pivotably coupled together, e.g., using flexures or flexible joints 285a, 285b. Accordingly and as further described below, actuation members 270a, 270b; anchor element 265 and flexible joints 285a, 285b may be integrally formed from a single piece of material to form retraction mechanism 260. Flexible joints 285a, 285b may elastically deform to accommodate the pivoting motion of actuation members 270a, 270b as plug connector 210 moves between an extended position (shown in FIG. 2A) and a retracted position (shown in FIG. 2B). In some embodiments, flexible joints 285a, 285b may be living hinges. Accordingly, embodiments of retraction mechanism 260 may be compliant mechanisms.

Device 205 may be docked in docking station 200 by aligning plug connector 210 with a connector of device 205 and pushing device 205 in direction 288a until plug connector 210 is mated with a receptacle connector of device 205. Prior to this mating event, plug connector 210 may be in the extended position as shown in FIG. 2A, with a portion of plug connector 210 flush with surface 265a of anchor element 265. Surface 265a may serve to limit the clockwise (the clockwise direction as in FIGS. 2A-2B) rotation of plug connector 210 as plug connector 210 cannot rotate past surface 265a. As will be discussed in greater detail below, retraction mechanism 260 may not retract plug connector 210 during this mating event despite the application of compression mating forces; this may be possible due to an inversion angle 290 between the orientations of plug connector 210 and actuation member 270a when plug connector 210 is in the extended position. Instead, retraction mechanism 260 may hold plug connector 210 in the extended position to facilitate the mating event.

Device 205 may be removed from docking station 200 by pulling device 205 in a direction opposite that of direction 288a. However, as discussed above, users may attempt to remove device 205 from docking station 200 in other ways that may potentially cause harmful off-axis forces—forces that are not along mating axis 240—to be exerted on plug connector 210. In one example, device 205 may be pushed forward by applying a force 292 to device 205 during a removal event. In response to force 292, retraction mechanism 260 may allow plug connector 210 to rotate in the direction of force 292 and retract into opening 220, thereby reducing the likelihood of breakage due the application of force 292.

The retracting motion of plug connector 210 can also aid in disconnecting plug connector 210 from device 205 as retraction mechanism 260 pulls plug connector 210 away from device 205 and device 205 is pulled in direction 288b by a user. In this embodiment, even if device 205 is not pulled in direction 288b, plug connector 210 will move to the retracted position (as shown in FIG. 2B) when force 292 is applied. As also shown in FIGS. 2A and 2B, retraction mechanism 260 is designed to move plug 210 between the extended and retracted positions without being obstructed by housing 215. Following the conclusion of the removal event, a biasing element may return plug connector 210 to the extended position from the retracted position. This biasing element will be discussed in further detail below.

FIGS. 2A and 2B also show that throughout the retracting and extending movements of plug connector 210, the change in orientation of the plug connector 210 may be proportional to the change in the extension distance of plug connector 210. For example, the difference between angles 245a and 245b may continually increase or decrease as plug connector 210 moves between the extended (as shown in FIG. 2A) and retracted (as shown in FIG. 2B) positions. Similarly, the extension distance, e.g., distances 230 and 255, may continually increase or decrease as plug connector 210 moves between the extended (as shown in FIG. 2A) and retracted (as shown in FIG. 2B) positions. That is, throughout the retracting and extending movements of plug connector 210, a change in the orientation of plug connector 210 may always be accompanied by a change in the extension distance—the distance between exterior surface 225 and distal end 235a.

Figure 2C:
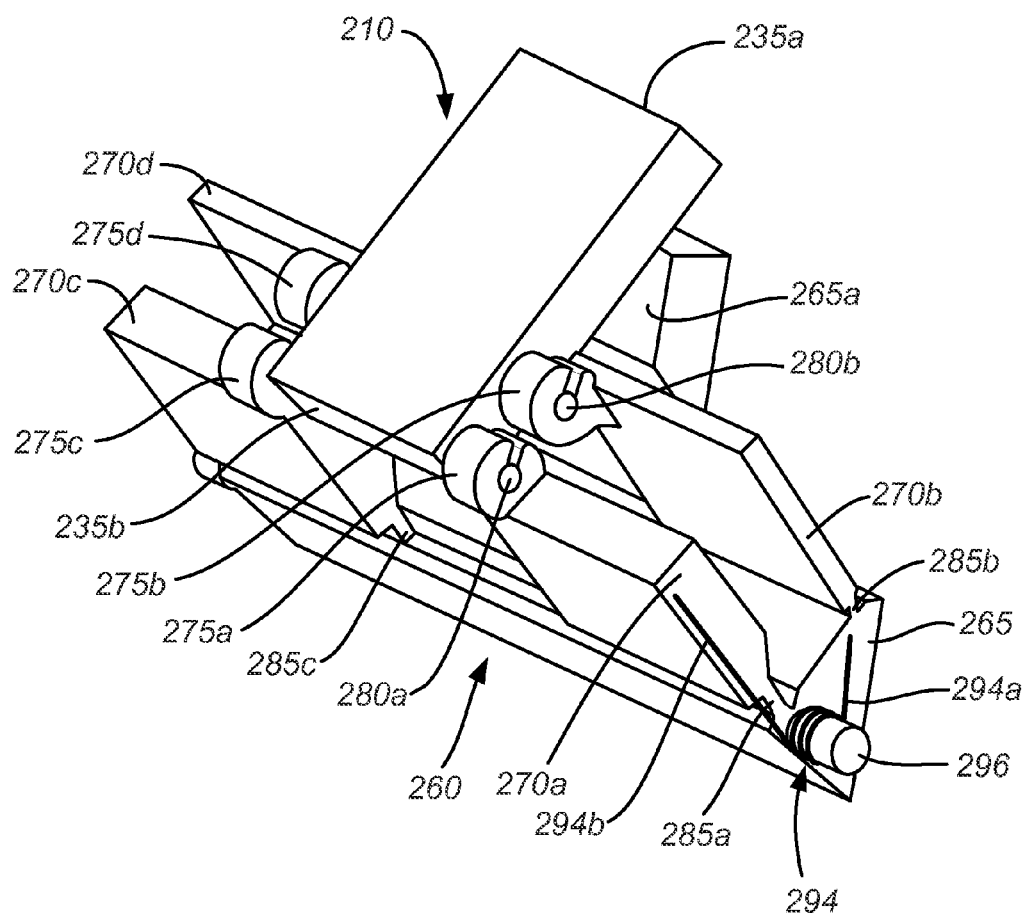
FIG. 2C illustrates a perspective view of the retraction mechanism of FIGS. 2A and 2B.

Furthermore, distal end 235a and proximal end 235b (as shown in FIG. 2C) may always move in opposite directions throughout the retracting and extending movements of plug connector 210. For example, as plug connector 210 moves from the extended position to the retracted position, distal end 235a may move away from a rest surface 215a and proximal end 235b may move in the opposite direction. And when plug connector moves from the retracted position to the extended position, distal end 235a may move back towards rest surface 215a and, again, proximal end 235b may move in the opposite direction.

Again, actuation members 270a, 270b; anchor element 265; and flexible joints 285a, 285b may be integrally formed from a single piece of material to form refraction mechanism 260. For example, retraction mechanism 260 may be made from polypropylene using an injection molding process that may implement gates at the flexible joint locations, e.g., at flexible joints 285a, 285b. In other embodiments, retraction mechanism 260 may be made from polyethylene. This once piece retraction mechanism design may be desirable for high volume production of docking stations according to the present invention. In this embodiment, anchor element 265 may be positioned within the cavity of housing 215 and attached to the interior of housing 215 by screws, adhesives, or any other suitable fastening method. In other embodiments, the retraction mechanism 260 may be integrally formed with housing 215 from a single piece of material.

As mentioned earlier, retraction mechanism 260 may guide plug connector 210 through a range of motions that do not require opening 220 to be large and unsightly. This may be possible because the relationship between the rotation and the extension and retraction movements of plug connector 210 may ensure that the portion of plug connector 210 moving through or positioned within opening 220 remains nearly at the same position with respect to opening 220 at all times. As a result, there may only be a small gap between plug connector 210 and an angled opening sidewall 220a and no gap between plug connector 210 and flat opening sidewall 220b when plug connector 210 is in the extended position (as shown in FIG. 2A). Furthermore, the small gap may not be readily visible to users because plug connector 215 and rest surface 215a may obstruct viewing of the small gap from front and back views of docking station 200, respectively. In one embodiment, opening 220 may only be around 20 percent larger than necessary to accommodate the thickness of plug connector 210. Hence, unsightly gaps between opening 220 and plug connector 210 may be reduced in order to maintain the cosmetic appearance of embodiments of docking stations according to the present invention.

As mentioned earlier, retraction mechanism 260 may not allow plug connector 210 to retract during mating events due the orientation of linkage 270a with respect to the orientation of plug connector 210—inversion angle 290—when plug connector 210 is in the extended position (as shown in FIG. 2A). A singularity, which may cause retraction mechanism 260 to be unable to respond to a force applied in a given direction (e.g., direction 288a in the present case) by retracting, may occur depending on the value of inversion angle 290. For example, if a singularity occurs, retraction mechanism 260 may be locked in the extended position when a mating force is applied in direction 288a and thus plug connector 210 may remain in the extended position such that the mating event can occur. As shown in FIG. 2A, inversion angle 290 may be between about 180 degrees and 181 degrees. In order for the singularity to exist, it may be necessary that inversion angle 290 be greater than about 180 degrees, but less than about 191 degrees. Accordingly, in some embodiments, the invention angle may be between about 180 and 190 degrees.

In addition to configuring docking station 200 as described above, the distance between pivot points, e.g., protrusions 280a, 280b, may also contribute to causing the singularity described above to occur. For example, protrusions 280a, 280b may be positioned such that the shortest distance between protrusions 280a, 280b may be between about 0.8 mm and 1.5 mm. In other embodiments, the shortest distance between protrusions 280a, 280b may be between about 0.1 mm and 2.0 mm However, the singularity described above may also result in flexible joint 285a absorbing the forces related to the compressive mating events thereby increasing the likelihood of breakage. To increase the strength of flexible joint 285a in order to deal with these compressive mating forces, flexible joint 285a may be molded in the injection molding process in the open state (as shown in FIG. 2B).

The following figure illustrates some additional features of retraction mechanism 260 that may be varied in order to strengthen flexible joint 285a as well as some other features of retraction mechanism 260.

FIG. 2C illustrates a perspective view of retraction mechanism 260 of FIGS. 2A and 2B. As shown in FIG. 2C, retraction mechanism 260 also includes additional actuation members 270c, 270d that were not visible in and not discussed with regards to FIGS. 2A-2B. Nonetheless, actuation members 270c, 270d may be included in the embodiment of docking station 200 shown in FIGS. 2A-2B. Furthermore, the discussion above of actuation members 270a, 270b and elements that interact with actuation members 270a, 270b may apply in whole or in part to actuation members 270c, 270d and corresponding elements that may interact with actuation members 270c, 270d, including those shown in FIG. 2C. However, some embodiments may only include one actuation member, e.g., actuation member 270a, or two actuation members, e.g., actuation members 270a, 270c, or other combinations of actuation members 270a, 270b, 270c and 270d.

Actuation members 270c, 270d are shown in FIG. 2C as being pivotably coupled to anchor element 265 and rotatably coupled to plug connector 210, which anchor element 265 and plug connector 210 were already shown in FIGS. 2A and 2B. Actuation members 270c, 270d may move in unison with actuation members 270a, 270b as plug connector 210 moves between the retraction and extension positions. FIG. 2C also shows that actuations members 270a, 270b, 270c and 270d and their respective flexible joints 285a, 285b, 285c and 285d may include a length dimension, whereas only the height and thickness dimensions were visible in FIGS. 2A and 2B. This length dimension may contribute to the overall strength of these actuation members 270a, 270b, 270c and 270d and their respective flexible joints. In particular, as the respective lengths of actuation members 270a, 270c and flexible joints 285a, 285c increase so do their capacities for absorbing the compressive mating event forces caused by the singularity described above.

In some embodiments, the thickness and length dimensions of actuations members 270a, 270b, 270c and 270d and their respective flexible joints may be varied to obtain the appropriate load capacity for a given application of docking station 200. For example, embodiments of docking station 200 intended to hold tablet computers may include one or more actuation members and respective flexible joints having a greater thickness and/or length than actuation members and respective flexible joints of embodiments of docking station 200 intended to hold phones.

As discussed above, retraction mechanism 260 may also include a biasing element for biasing plug connector 210 in the extended position (as shown in FIG. 2A). As shown in FIG. 2C, a biasing element 294 may be wrapped around or coupled to a protrusion 296 positioned on anchor element 265. A first end 294a of biasing element 294 may be coupled to anchor element 265 and a second end 294b of biasing element 294 may be coupled to actuation member 270a. This configuration results in a biasing mechanism that may be capable of returning plug connector 210 to its extended position after rotating and retracting into the retracted position in response to an applied torque. The biasing force of biasing element 294 may increase as plug connector 210 moves farther from the extended position (as shown in FIG. 2A) and towards the retracted position (as shown in FIG. 2B). In one embodiment, biasing element 294 may be a torsion spring.

In other embodiments, a biasing element, e.g., biasing element 294, may be coupled with more than one actuation member of retraction mechanism 260. For example, a biasing element may be coupled to both actuation members 270a and 270c. This embodiment may provide a greater biasing force to help ensure actuation members 270a and 270c return to an orientation in the extended position where inversion angle 290 is such that a singularity occurs that prevents plug connector 210 from retracting during mating events with device 210 (as shown in FIGS. 2A and 2B). In yet additional embodiments, biasing element 294, which may be a compression or tensile spring, may be attached at one end to proximal end 235b and at the other end to a position within the cavity of housing 215 such that plug connector 210 is biased in the extended position.

In yet additional embodiments, a biasing element may also be implemented to keep a docked electronic device in a position to be supported by a rest surface (e.g., rest surface 215a as shown in FIGS. 2A and 2B) of docking station 200.

Although not shown in FIG. 2C, proximal end 235b may include an electrical coupling, e.g., a flex circuit, for electrically coupling contacts (not shown in FIG. 2C) of plug connector 210 with electronic circuitry disposed within the cavity of housing 215 (as shown in FIGS. 2A and 2B).

As discussed previously, a singularity may result in flexible joints 285a, 285c absorbing forces related to compressive mating events. Designs and methods for strengthening flexible joints to deal with these compressive forces are discussed above. The following figure shows an example of another way to address these compressive forces.

Figure 2D:
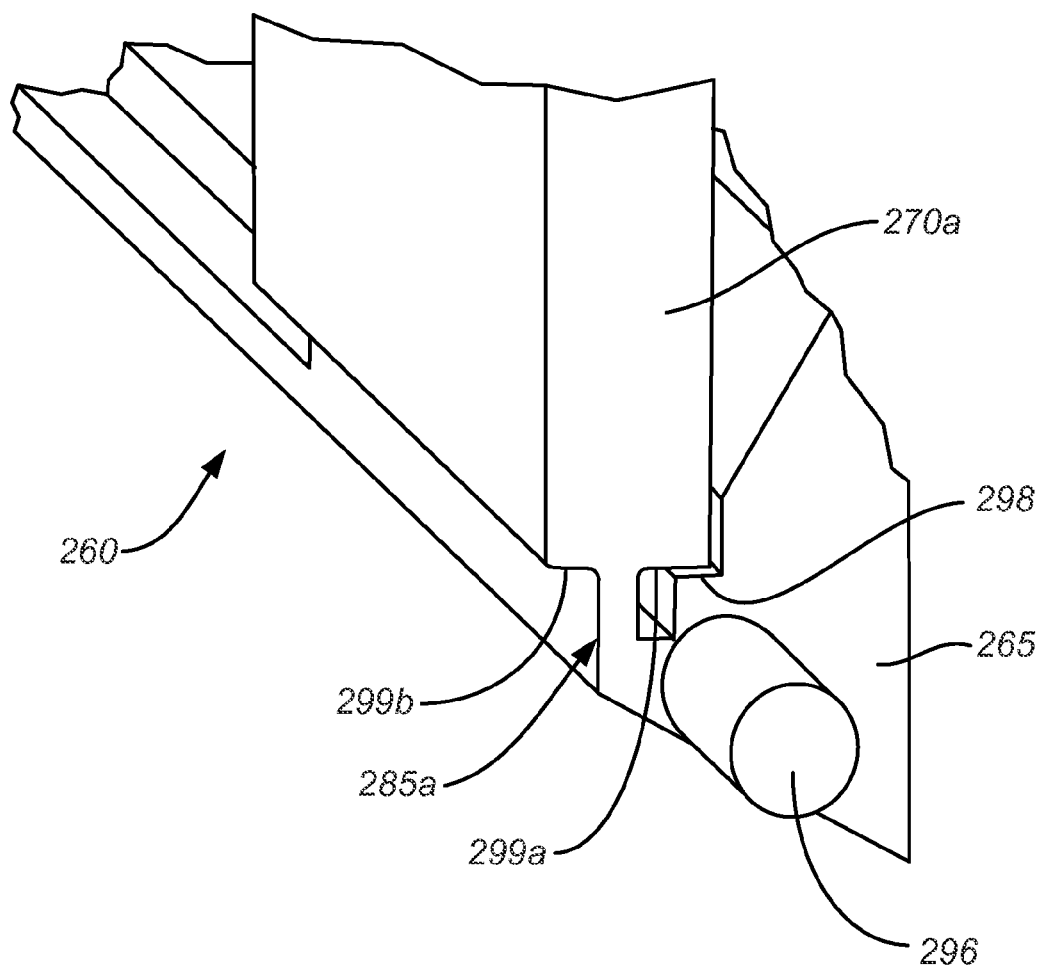
FIG. 2D shows a magnified perspective view of the retraction mechanism of FIGS. 2A-2C.

FIG. 2D shows a magnified perspective view of retraction mechanism 260 of FIGS. 2A-2C. As shown in FIG. 2D, retraction mechanism 260 may include a step feature 298. Step feature 298 is positioned and shaped to engage with an upper portion 299a of flexible joint 285a when plug connector 210 is in the extended position (as shown in FIG. 2A). As such, when a singularity occurs at the extended position, compressive forces related to mating events may be translated through actuation member 270a and absorbed by step feature 298. Otherwise, flexible joint 285a would have to absorb those compressive forces, which may lead to durability issues for retraction mechanism 260. Although not visible in FIG. 2D, a step feature may be positioned and shaped to engage an upper portion of each of flexible joints 285b, 285c and 285d as well. In some embodiments, retraction mechanism 260 may only include two step features, e.g., step features may be positioned and shaped to engage actuation members 285a, 285c.

Although docking station 200 has been discussed above with regards to FIGS. 2A-2D as including flexible joints to pivotally couple actuation members, e.g., actuation members 270a, 270b, 270c and 270d, to anchor element 265, other joints or couplings may be used instead of flexible joints. For example, rigid joints such as mechanical joints may be used, e.g., pin or revolute joints. In some embodiments, retraction mechanism 260 can also include gears, cams, followers, and the like in addition to or instead of pin and/or flexible joints.

An additional embodiment of a docking station according to the present invention is shown in following figures.

FIGS. 3A and 3B show cross-sectional views of a docking station 300 according to an embodiment of the present invention with a portable electronic device 305 docked therein. FIG. 3A shows a plug connector 310 of docking station 300 in a retracted position and connected with device 305. FIG. 3B shows plug connector 310 in an extended position and nearly disconnected from device 305. Except for those elements of docking station 300 specifically discussed below, the discussion of the elements of docking station 200 above may apply to corresponding elements of docking station 300. In addition, the discussion of the elements of docking station 200 may still apply to some of those corresponding elements of docking station 300 specifically discussed below.

Plug connector 310 may be movable between an extended position (as shown in FIG. 3B) and a retracted position (as shown in FIG. 3A) for engaging a corresponding connector (e.g., connector 35 as shown in FIG. 1A) of device 305. More specifically, FIG. 3A shows plug connector 310 in the retracted position with plug connector 310 protruding through an opening 320 in exterior surface 325 of housing 315. An axis 340a may define the orientation of plug connector 310 in the retracted position, which axis 340a may be perpendicular with respect to the plane in which exterior surface 325 is oriented such that axis 340a is at an angle 345a with respect to vertical 350. As shown in FIG. 3A, angle 345a may be about 15 degrees. In some embodiments, angle 345a may be between about 10 and 35 degrees. In other embodiments, angle 345a may be such that plug connector 310 is orientated in a substantially vertical orientation (e.g., within about 5 degrees of vertical 350). FIG. 3A also shows plug connector 310 may be partly within an interior of housing 315 and extend through opening 320 when in the extended position.

FIG. 3B shows plug connector 310 in the extended position with plug connector 310 rotated forward (clockwise as shown) and extending farther out of housing 315, as compared to the retracted position. As shown in FIG. 3B, device 305 may be disconnected from plug connector 310 when plug connector 310 is in the extended position. However, as device 305 is initially removed from plug connector 310, plug connector 310 merely extends out further without disconnecting from device 310. Once plug connector 310 is fully extended (as shown in FIG. 3B), device 310 may begin to disconnect from plug connector 310. Axis 340b may define the orientation of plug connector 310 in the retracted position, which axis 340b may be at an angle 345b with respect to axis 340a.

As shown in FIG. 3B, angle 345b may be about 30 degrees. In other embodiments, angle 345b may be between about 5 and 40 degrees.

As discussed above, the movement of plug connector 310 may be a combination of different movements, e.g., rotating and retracting into or extending out of opening 320. A retraction mechanism 360 may guide plug connector 310 between the retracted and extended positions. As shown in FIGS. 3A and 3B, retraction mechanism 360 may be rotatably coupled with plug connector 310. For example, retraction mechanism 360 may include linkages or actuation members, e.g., an actuation member 370b, that are rotatably coupled to plug connector 310.

As shown in FIGS. 3A and 3B, linkages or actuation members, e.g., actuation member 370b, of retraction mechanism 360 may be pivotally coupled to an anchor element 365 of retraction mechanism 360. Similar to retraction mechanism 260, retraction mechanism 360 may be integrally formed from a single piece of material. In comparison with retraction mechanism 260, retraction mechanism 360 is positioned on an interior surface of housing 315 opposite the interior surface on which retraction mechanism 260 is positioned within housing 215 (as shown in FIGS. 2A and 2B). Some embodiments of retraction mechanism 360 may be compliant mechanisms.

Device 305 may be docked in docking station 300 by aligning plug connector 310 with a connector of device 305 and pushing device 305 in direction 388a until plug connector 310 is mated with a receptacle connector of device 305. Prior to this mating event, plug connector 310 may be in the retracted position as shown in FIG. 3A, with a proximal end of plug connector 310 flush with an interior surface 315a of housing 315. Surface 315a may serve to limit the retraction of plug connector 310 by physically obstructing further retraction. Hence, interior surface 315a may hold plug connector 310 in position—the retracted position as shown in FIG. 3A—as plug connector 310 is mated with a receptacle connector of device 305.

Device 305 may be removed from docking station 300 by pulling device 305 in a direction opposite that of direction 388a. However, as discussed above, users may attempt to remove device 305 from docking station 300 in other ways that may potentially cause harmful off-axis forces—forces that are not along axis 340a—to be exerted on plug connector 310. In one example, device 305 may be pushed forward by applying a force 392 to device 305 during a removal event. In response to force 392, retraction mechanism 360 may allow plug connector 310 to rotate in the direction of force 392 and extend farther out of opening 320, thereby reducing the likelihood of breakage due the application of force 392.

Once retraction mechanism 360 guides plug connector 310 to the extended position (as shown in FIG. 3B), the application of force to device 305 in direction 388b may cause device 315 to disconnect from docking station 300. As shown in FIGS. 3A and 3B, retraction mechanism 360 is designed to move plug connector 310 between the extended and retracted positions without being obstructed by housing 315. Following the conclusion of the removal event, a biasing element may return plug connector 310 to the retracted position from the extended position. This biasing element will be discussed in further detail below.

FIGS. 3A and 3B also show that throughout the refracting and extending movements of plug connector 310, the change in orientation of the plug connector 310 may be proportional to the change in extension distance of plug connector 310. Furthermore, distal and proximal ends of plug connector 310 may always move in opposite directions throughout the retracting and extending movements of plug connector 310.

Retraction mechanism 360 may guide plug connector 310 through a range of motions that do not require opening 320 to be large and unsightly. This may be possible because the relationship between the rotation and the extension and retraction movements of plug connector 310 may ensure that the portion of plug connector 310 moving through or positioned within opening 320 remains nearly at the same position with respect to opening 320 at all times. Hence, unsightly gaps between opening 320 and plug connector 310 may be reduced in order to maintain the cosmetic appearance of embodiments of docking stations according to the present invention.

As discussed above, retraction mechanism 360 may also include a biasing element for biasing plug connector 310 in the retracted position (as shown in FIG. 3A). As shown in FIGS. 3A and 3B, a biasing element 394 may be coupled to an actuation member of retraction mechanism 360, e.g., an actuation member 370b. This configuration results in a biasing mechanism that may be capable of returning plug connector 310 to its retracted position after rotating and extending into the extended position (as shown in FIG. 3B) in response to an applied torque, e.g., a torque resulting from the application of force 392. The biasing force of biasing element 394 may increase as plug connector 310 moves farther from the retracted position and towards the extended position. Biasing element 394 may be a compression or tensile spring.

In other embodiments, a biasing element, e.g., biasing element 394, may be coupled with more than one actuation member of refraction mechanism 360. In yet additional embodiments, biasing element 394 may be attached at one end to the proximal end of plug connector 310 and at the other end to a position within the cavity of housing 315 such that plug connector 310 is biased in the retracted position. These biasing elements may also be implemented to hold plug connector 310 in the extended position such that the docked electronic device 305 (as shown in FIG. 3A) is held in position to be supported by a rest surface 315 (as shown in FIG. 3B) of docking station 300.

Yet another embodiment of a docking station according to the present invention is shown in following figures.

Figure 4A:
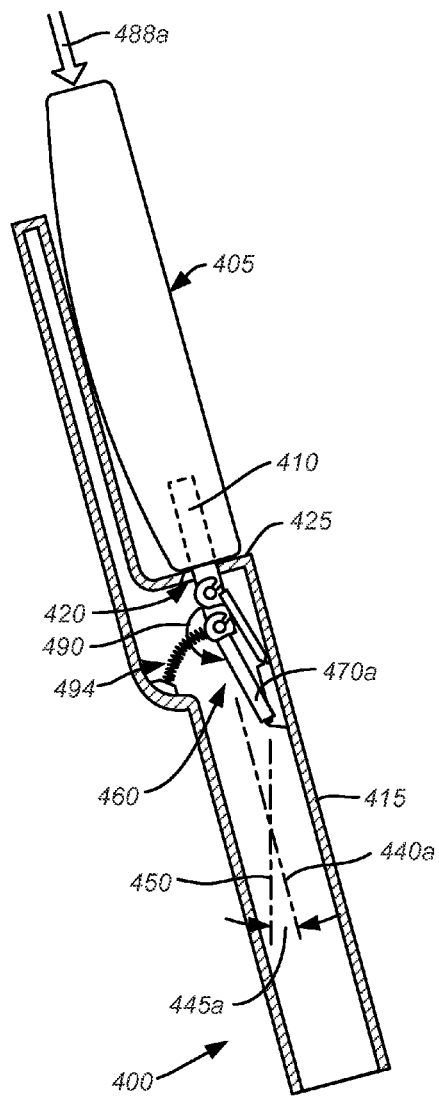
FIGS. 4A and 4B show cross-sectional views of a docking station 400 according to an embodiment of the present invention with a portable electronic device docked therein.
Figure 4B:
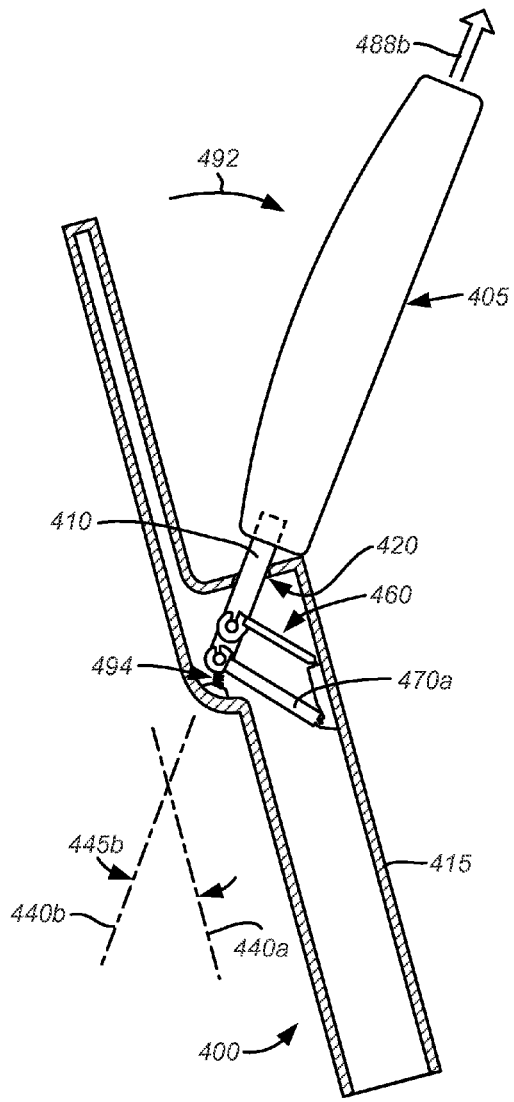

FIGS. 4A and 4B show cross-sectional views of a docking station 400 according to an embodiment of the present invention with a portable electronic device 405 docked therein. FIG. 4A shows a plug connector 410 of docking station 400 in an extended position and connected with device 405. FIG. 4B shows plug connector 410 in a retracted position and nearly disconnected from device 405. As with docking station 300, except for those elements of docking station 400 specifically discussed below, the discussion of the elements of docking station 200 above may apply to corresponding elements of docking station 400. In addition, the discussion of the elements of docking station 200 may still apply to some of those corresponding elements of docking station 400 specifically discussed below.

Docking station 400 may be movable between a retracted position and an extended position for engaging a corresponding connector of device 405. More specifically, FIG. 4A shows plug connector 410 in the extended position with a plug connector 410 protruding through an opening 420 in exterior surface 425 of housing 415. Axis 440a may define the orientation of plug connector 410 in the extended position, which axis 440a may be perpendicular with respect to the plane in which exterior surface 425 is oriented such that axis 440a is at an angle 445a with respect to vertical 450. As shown in FIG. 4A, angle 445a may be about 15 degrees. In some embodiments, angle 445a may be between about 10 and 35 degrees. In other embodiments, angle 445a may be such that plug connector 410 is orientated in a substantially vertical orientation (e.g., within about 5 degrees of vertical 450). FIG. 4A also shows plug connector 410 can be partly within an interior of housing 415 and extend through opening 420 when in the extended position.

FIG. 4B shows plug connector 410 in the retracted position with plug connector 410 rotated forward (clockwise as shown) and partially retracted into housing 415 with device 405 nearly disconnected from plug connector 410. In this retracted position, plug connector 410 still protrudes through opening 420, but at a lesser distance as compared to the extended position. Axis 440b may define the orientation of plug connector 410 in the retracted position, which axis 440b may be at an angle 445b with respect to axis 440a. As shown in FIG. 4B, angle 445b may be about 30 degrees. In other embodiments, angle 445b may be between about 5 and 40 degrees.

As discussed above, the movement of plug connector 410 between the extended and retracted positions may be a combination of different movements, e.g., rotating and retracting into or extending out of opening 420. A retraction mechanism 460 may guide plug connector 410 between the extended and refracted positions. As shown in FIGS. 4A and 4B, retraction mechanism 460 may be rotatably coupled with plug connector 410. Linkages or actuation members, e.g., an actuation member 470a, may be pivotably coupled to anchor element 465 of retraction mechanism 460. Similar to retraction mechanism 260, retraction mechanism 460 may be integrally formed from a single piece of material. Some embodiments of retraction mechanism 460 may be compliant mechanisms.

Device 405 may be docked in docking station 400 by aligning plug connector 410 with a connector of device 405 and pushing device 405 in direction 488a until plug connector 410 is mated with a receptacle connector of device 405. As will be discussed in greater detail below, retraction mechanism 460 may not retract plug connector 410 during this mating event despite the application of compression mating forces; this may be possible due to a biasing element that will be discussed in detail below. This biasing element may hold plug connector 410 in the extended position to facilitate the mating event.

Device 405 may be removed from docking station 400 by pulling device 405 in a direction opposite that of direction 488a and along orientation axis 440a. However, as discussed above, users may attempt to remove device 405 from docking station 400 in other ways that may potentially cause harmful off-axis forces—forces that are not along axis 440a—to be exerted on plug connector 410. In one example, device 405 may be pushed forward by applying a force 492 to device 405 during a removal event. In response to force 492, retraction mechanism 460 may allow plug connector 410 to rotate in the direction of force 492 and retract into opening 420, thereby reducing the likelihood of breakage due the application of force 492.

The retracting motion of plug connector 410 can also aid in disconnecting plug connector 410 from device 405 when retraction mechanism 460 pulls plug connector 410 away from device 405 and device 405 is pulled in direction 488b by a user. In this embodiment, even if device 405 is not pulled in direction 488b, plug connector 410 will move to the retracted position (as shown in FIG. 4B) when force 492 is applied. As also shown in FIGS. 4A and 4B, retraction mechanism 460 is designed to move plug 410 between the extended and retracted positions without being obstructed by housing 415. Following the conclusion of the removal event, a biasing element may return plug connector 410 to the extended position from the retracted position. Again, this biasing element will be discussed in further detail below.

FIGS. 4A and 4B also show that throughout the refracting and extending movements of plug connector 410, the change in orientation of the plug connector 410 may be proportional to the change in extension distance of plug connector 410. Furthermore, distal and proximal ends of plug connector 410 may always move in opposite directions throughout the retracting and extending movements of plug connector 410.

In contrast with docking station 200, a singularity may not occur when plug connector 410 is in the extended position (as shown in FIG. 4A). As shown in FIG. 4A, inversion angle 490 may be about 195 degrees. However, in order for a singularity to exist, it may be necessary that inversion angle 490 be greater than about 180 degrees, but less than about 191 degrees. Accordingly, a singularity may not cause retraction mechanism 460 to be locked in the extended position when a mating force is applied in direction 488a. Thus, plug connector 410 may not remain in the extended position during a mating event unless a sufficient biasing force is provided by a biasing element.

Retraction mechanism 460 may also include a biasing element 494 for biasing plug connector 410 in the extended position (as shown in FIG. 4A). As shown in FIGS. 4A and 4B, biasing element 494 may be coupled to an actuation member of refraction mechanism 460, e.g., an actuation member 470a. This configuration results in a biasing mechanism that may be capable of returning plug connector 410 to its extended position after rotating and retracting into the refracted position in response to an applied torque, e.g., a torque resulting from the application of force 492. As discussed earlier, biasing element 494 may also provide a sufficient biasing force so that plug connector 410 may remain in the extended position during a mating event. Biasing element 494 may be a compression or tensile spring.

In other embodiments, a biasing element, e.g., biasing element 494, may be coupled with more than one actuation member of refraction mechanism 460. In yet additional embodiments, biasing element 494 may be attached at one end to the proximal end of plug connector 410 and at the other end to a position within the cavity of housing 415 such that plug connector 410 is biased in the extended position.

The specific details of particular embodiments may be combined in any suitable manner or varied from those shown and described herein without departing from the spirit and scope of embodiments of the invention. Moreover, the invention may also provide other features of docking stations, such as speakers, video screen computers, and charging mechanisms.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A docking station comprising:
    a housing that defines a cavity, the housing including an opening in an exterior surface that communicates with the cavity;
    a plug connector movable between a first position where the plug connector extends a first distance out of the opening in a first orientation and a second position where the plug connector extends out of the opening at a second distance that is different than the first distance in a second orientation that is different than the first orientation;
    an anchor element positioned within the cavity; and
    one or more actuation members, each actuation member being pivotably coupled to the anchor element and rotatably coupled to the plug connector,
    wherein when a torque is applied to a distal end of the plug connector in the first position, the one or more actuation members move the plug connector to the second position.

2. The docking station of claim 1 wherein the first orientation is a substantially vertical orientation.

3. The docking station of claim 1 wherein the first orientation is at an angle between about 10 and 35 degrees with respect to vertical.

4. The docking station of claim 1 wherein the second orientation is at an angle between about 5 and 40 degrees with respect to the first orientation.

5. The docking station of claim 1 wherein the one or more actuation members are pivotably coupled to the anchor element using flexible joints.

6. The docking station of claim 5 wherein the flexible joints are living hinges.

7. The docking station of claim 5 wherein the anchor element includes a step feature that may engage with an upper portion of one or more of the flexible joints when the plug connector is in the first position.

8. The docking station of claim 1 wherein the anchor element and the one or more actuation members are integrally formed through an injection molding process.

9. The docking station of claim 8 wherein the anchor element and the one or more actuation members are made from polypropylene.

10. The docking station of claim 1 wherein the docking station includes first, second, third and fourth actuation members, wherein pivotable couplings of the first and second actuation members are farther from the opening than pivotable couplings of the third and fourth actuation members, and wherein the first and second actuation members are oriented at an inversion angle between about 180 and 190 degrees with respect to the plug connector when the plug connector is in the first position.

11. The docking station of claim 10 wherein the first and third actuation members and the second and fourth actuation members are rotatably coupled to the plug connector at points on the plug connector separated by a distance between about 0.1 and 2.0mm.

12. The docking station of claim 10 wherein a portion of the plug connector is flush with a portion of the anchor element when the plug connector is in the first position.

13. The docking station of claim 1 wherein the plug connector includes one or more protrusions for rotatably coupling with corresponding hooks positioned on one or more of the actuation members.

14. The docking station of claim 1 wherein the change in orientation between the first and second orientations is proportional to the change in distance between the first and second distances.

15. The docking station of claim 1, further comprising a biasing element coupled to one or more of the actuation members to bias the one or more actuation members to position the plug connector in the first position.

16. The docking station of claim 15 wherein the second distance is shorter than the first distance.

17. The docking station of claim 15 wherein the biasing element is a torsion spring.

18. The docking station of claim 1 wherein the one or more actuation members move the plug connector to the second position by pivoting with respect to the anchor element and rotating with respect to the plug connector.

19. The docking station of claim 1 wherein each actuation member is pivotably coupled to the anchor element about a first axis of rotation and rotatably coupled to the plug connector about a second axis of rotation, the second axis of rotation being substantially parallel to the first axis of rotation.

20. A docking station for a portable electronic device, the docking station comprising:
- a housing that defines a cavity, the housing including an opening in an exterior surface that communicates with the cavity;
- a plug connector movable between a first position where the plug connector extends a first distance out of the opening in a first orientation and a second position where the plug connector extends out of the opening at a second distance that is longer than the first distance in a second orientation that is different than the first orientation, the plug connector configured to receive and electrically couple to a receptacle connector of the portable electronic device;
- a retraction mechanism that causes the plug connector to move between the first and second positions, the retraction mechanism including:
    - an anchor element positioned within the cavity;
    - one or more actuation members, each actuation member being pivotably coupled to the anchor element and rotatably coupled to the plug connector; and
    - a biasing element coupled to one or more of the actuation members to bias the actuation members to position the plug connector in the first position; and
    - electronic circuitry electrically coupled with contacts of the plug connector.

21. The docking station of claim 20, wherein the housing further includes a resting surface adapted to support the portable electronic device when the portable electronic device is coupled to the plug connector in the first position.

22. The docking station of claim 20, wherein the biasing element includes at least one spring that provides a biasing force that increases as the plug connector moves farther from the first position.

23. The docking station of claim 20, wherein a flex circuit electrically couples the electronic circuitry with the contacts of the plug connector.

24. The docking station of claim 20 wherein the one or more actuation members are pivotably coupled to the anchor element using flexible joints.

25. The docking station of claim 24 wherein the flexible joints are living hinges.

26. A docking station comprising:
- a housing that defines a cavity, the housing including an opening in an exterior surface that communicates with the cavity, and including a first end and a second end opposite the first end;
- a plug connector that rotates between a first position where the plug connector extends a first distance out of the opening in a first orientation and a second position where the plug connector extends out of the opening at a second distance that is shorter than the first distance in a second orientation where a distal end of the plug connector is rotated from the first orientation toward the first end of the housing and a proximal end of the plug connector is rotated from the first orientation toward the second end of the housing;
- an anchor element positioned within the cavity;
- an actuation member pivotably coupled to the anchor element and rotatably coupled to the plug connector, that, when a torque is applied to the plug connector in the first position, moves the plug connector to the second position; and
- a biasing element coupled to the actuation member that biases the actuation member to position the plug connector in the first position.

27. The docking station of the claim 26, wherein the opening includes first and second opposing opening sidewalls, and wherein the first sidewall is angled to accommodate the rotation of the plug connector between the first and second positions.

28. The docking station of claim 26 wherein the one or more actuation members are pivotably coupled to the anchor element using flexible joints.

29. The docking station of claim 26 wherein the anchor element and the one or more actuation members are integrally formed through an injection molding process.

30. The docking station of claim 26 further comprising another actuation member that is pivotably coupled to the anchor element and rotatably coupled with the plug connector, wherein the actuation members cooperate to move the plug connector between the first and second positions.

* * * * *